J. J. GRANT.
Chucks for Metal Lathes.

No. 148,607.  Patented March 17, 1874.

Witnesses:

Inventor:
John J. Grant
by Chas. S. Whitman
Attorney.

UNITED STATES PATENT OFFICE.

JOHN J. GRANT, OF GREENFIELD, MASSACHUSETTS, ASSIGNOR OF ONE-HALF HIS RIGHT TO SOLON L. WILEY, OF SAME PLACE.

IMPROVEMENT IN CHUCKS FOR METAL-LATHES.

Specification forming part of Letters Patent No. 148,607, dated March 17, 1874; application filed January 30, 1874.

*To all whom it may concern:*

Be it known that I, JOHN J. GRANT, of Greenfield, in the county of Franklin and State of Massachusetts, have invented certain Improvements in Lathe-Chucks. The following description, taken in connection with the accompanying plate of drawings hereinafter referred to, forms a full and exact specification, wherein are set forth the nature and principles of the invention, by which the same may be distinguished from others of a similar class, together with such parts thereof as are claimed as new and are desired to be secured by Letters Patent of the United States.

My invention relates to lathe-chucks in which the jaws are simultaneously moved in a radial direction; and the nature thereof consists in certain improvements in the construction of the same, and novel combination of the parts thereof, as hereinafter described, whereby the motion of the jaws in their radial slots is rendered uniform and is isochronal, the parts are perfectly balanced, and the threads cut upon the jaws may be constructed of the same pitch.

Figure 1:
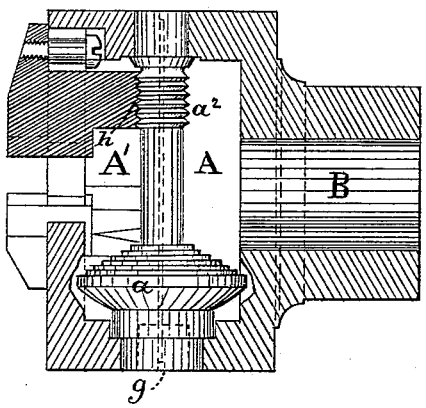
Figure 2:
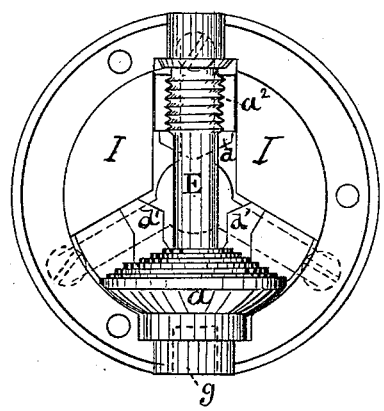
Figure 3:
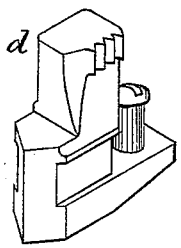
Figure 4:
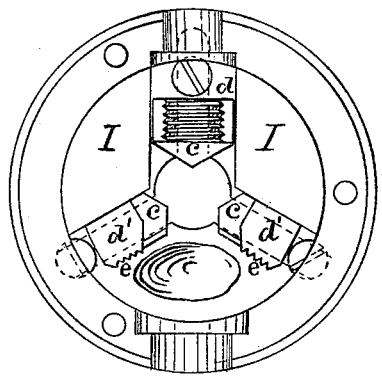

In the accompanying drawing, in which corresponding parts are designated by similar letters, Figure 1 is a central vertical section of the chuck taken in the direction of the shaft. Fig. 2 is a plan of that part of the case which contains the operative mechanism. Fig. 3 illustrates one of the jaws detached. Fig. 4 is a plan of the case of the chuck, from which the shaft has been removed in order that the arrangement of the jaws may be fully observed.

The casing of the chuck, which incloses and sustains the mechanism, consists of two parts of cylindrical form, A A', through which passes a cylindrical aperture, B. The part A' of the casing is provided with three radial openings, C, within which the sliding jaws $d$ $d'$ $d'$ are so arranged that they may be easily and steadily moved. The jaws are moved in a radial direction by the shaft E, which is arranged to rotate in bearings cut in the casing. The said shaft is provided with the conical spiral screw $a$, which meshes into segmental female screws $e$, cut upon the sides of jaws $d'$ in such a manner that the revolution of the said shaft will cause the said jaws to move in a radial direction and with an isochronal and uniform motion. Upon the said shaft is also cut a screw, $a^2$, which meshes into a segmental female screw, $h$, upon the top of the jaw $d$, in such a manner that the revolution of the said shaft causes the said jaw to move in the radial slot isochronally with the jaws $d'$ $d'$. The said shaft is rotated by a wrench, the end of which has the form of a triangular prism and fits accurately in a slot, $g$, of corresponding shape, cut in the end of the said shaft.

By this arrangement of parts the motion of the jaws is rendered simultaneous, isochronal, and uniform, and, as the threads cut upon the jaws are all of the same pitch, the implement may be worked with a much greater degree of accuracy than would be possible if the pitch were differential. The segmental posts I steady the said jaws and retain them in position while being moved backward and forward by the rotation of the said shaft.

Having thus described the construction and operation of my invention, I will indicate what I claim, and desire to secure by Letters Patent of the United States, in the following clauses—that is to say:

1. The shaft E, provided with a conical spiral screw, $a$, jaws $d$, provided with segmental female screws $e$ and segmental posts I, combined and operating together as described.

2. The combination of the shaft E, provided with a triangular slot, $g$, and having formed thereon, a conical spiral screw, $a$, and screw $a^2$, the casing A', provided with radial openings $c$, the jaws $d$ $d'$ $d'$, and the casing A, through which passes the cylindrical aperture B, all operating together as described.

In testimony that I claim the foregoing I have hereunto set my hand this 24th day of December, 1873.

JOHN J. GRANT.

Witnesses:
GORHAM D. WILLIAMS,
S. L. WILEY.